United States Patent [19]

Howe

[11] Patent Number: 5,091,459

[45] Date of Patent: Feb. 25, 1992

[54] THERMOPLASTIC BLOW MOLDABLE POLYETHYLENE TEREPHTHALATE COMPOSITIONS

[75] Inventor: King L. Howe, Wilmington, Del.

[73] Assignee: E. I. du Pont de Nemours and Company, Wilmington, Del.

[21] Appl. No.: 539,649

[22] Filed: Jun. 18, 1990

[51] Int. Cl.⁵ .............................. C08L 67/02
[52] U.S. Cl. ............................... 524/456; 524/513; 525/166; 525/176
[58] Field of Search ............. 525/166; 524/513, 456

[56] References Cited

U.S. PATENT DOCUMENTS

| | | |
|---|---|---|
| 3,673,139 | 6/1972 | Hrach ........................... 525/177 |
| 4,034,013 | 7/1977 | Lane . |
| 4,246,378 | 1/1981 | Kometani et al. . |
| 4,659,757 | 4/1987 | Okamoto et al. . |
| 4,753,980 | 1/1988 | Deyrup . |
| 4,912,167 | 3/1990 | Deyrup et al. . |
| 4,914,152 | 4/1990 | Miyashita ........................... 525/68 |
| 4,914,156 | 4/1990 | Howe . |

FOREIGN PATENT DOCUMENTS 59-184251 10/1984 Japan .

*Primary Examiner*—Patricia Short

[57] ABSTRACT

Semi-crystalline blow moldable polyester compositions, formed by melt blending a polyester, an ethylene copolymer containing epoxide groups, an ionomer obtained by neutralizing with Na+ or K+ and optionally a second polyester.

11 Claims, No Drawings

THERMOPLASTIC BLOW MOLDABLE POLYETHYLENE TEREPHTHALATE COMPOSITIONS

BACKGROUND OF THE INVENTION

Polyesters that are semicrystalline, particularly poly(ethylene terephthalate), PET, are used extensively in many applications that require good solvent resistance and good properties at elevated temperatures. They are ordinarily processed by injection molding, but there are many components of automobiles and other systems wherein such parts are hollow and to manufacture these by injection molding is very difficult and expensive. Many such parts can conceivably be made by blow molding provided the polymer system has adequate melt strength and melt viscosity and yields smooth high quality surfaces in the blow molded parts. Unfortunately, polyesters commercially available for injection molding and extrusion have melt viscosities which are too low to make them suitable for extrusion blow molding. It would be desirable to have blow moldable polyester compositions which provide moldings having smooth surfaces made from commercial injection moldable and extrusion grades of polyesters.

The addition of conventional di- and polyepoxides and, more recently, the addition of ethylene copolymers containing glycidyl groups have been suggested for increasing the melt strength and viscosity of polyesters, but are not suitable for blow molding large objects having smooth surfaces and having complex cross-sections such as automobile parts.

Further improvements in melt strength and melt viscosity have been provided by compositions which in addition to the ethylene copolymers containing glycidyl groups use small amounts of catalytic cations which may be introduced in the form of a zinc ionomer. Unfortunately it has been found that these catalyzed compositions may form small lumps when the compositions are exposed to processing temperatures for an extended period of time. Such prolonged exposure is not unusual in commercial blow molding operations where a substantial proportion of the resin must be recycled as regrinds. The presence of these lumps results in molded objects having surface blemishes or surface irregularities.

Thus a need still exists for polyester compositions, particularly for PET-based compositions, which have sufficient melt strength and viscosity to permit extrusion blow molding of large and complex objects which at the same time exhibit uniform, smooth surfaces.

BACKGROUND ART

U.S. Pat. No. 4,659,757, granted Apr. 21, 1987 to Okamoto et al., discloses poly(ethylene terephthalate) (PET) molding compositions yielding impact resistant articles prepared by melt blending PET with 3 to 60 parts of a second polyester selected from the group consisting of (1) copolymers of ethylene glycol, terephthalic acid and aliphatic dicarboxylic acids containing at least 12 carbon atoms (2) copolymers of ethylene glycol, terephthalic acid and a poly(alkylene oxide) glycol, and (3) polyarylates. In addition the compositions must also contain (i) a nucleating agent selected from the group of finely divided inorganic nucleating agents, a metal salt of an organic carboxylic acid and an ionomer, (ii) a polyolefin to which has been grafted an olefin having carboxyl or anhydride groups, (iii) an olefin copolymer containing units derived from glycidyl (meth)acrylate and optionlly units derived from vinyl acetate as a third monomer and (iv) an ester-based plasticizer. As claimed, the compositions must contain the second polyester and each of ingredients (i), (ii), (iii) and (iv).

U.S. Pat. No. 4,912,167, granted Mar. 27, 1990 to Deyrup et al and U.S. Pat. No. 4,914,156, granted Apr. 3, 1990 to Howe, disclose compositions which are blow moldable PET or poly(butylene terephthalate), PBT, containing an epoxide group-containing copolymer and a source of catalytic metal cations which source could be a small amount of a zinc ionomer, for example. The patents disclose olefin copolymers and acrylate copolymers containing epoxide groups, but prefers the olefin copolymers. The examples of the reference demonstrate that sodium ionomers are ineffective in providing blow moldability when used at the same concentration at which zinc ionomers are effective.

U.S. Pat. No. 4,783,980, granted Jan. 28, 1988 to Deyrup discloses toughened thermoplastic polyester compositions prepared by melt blending at high shear 3–40 weight percent of an ethylene copolymer containing epoxide groups and 10–40 weight percent of units derived from a $C_2$–$C_8$ alkyl (meth)acrylate. A variety of optional ingredients may be added including plasticizers, poly(alkylene oxide) segments and crystallization promoters. As crystallization promoters one can use salts of hydrocarbon acids containing 7 to 54 carbon atoms or salts of ionomeric polymers. Example 1 discloses a single poly(ethylene terephthalate) composition which contains 3.8 weight percent of a sodium ionomer of an ethylene/methacrylic acid copolymer added as a crystallization promoter.

U.S. Pat. No. 4,034,013 granted July 5, 1977 to Lane discloses that the notched impact strength and melt strength of PET and PBT are improved by incorporating small particles of a core-shell polymer wherein the core is a rubbery acrylate copolymer and the shell is a more rigid acrylate or styrene copolymer containing epoxide groups.

Japanese Patent Publication 59-184251, published Oct. 19, 1984 discloses that polyether ester block copolymers (100 parts) derived essentially from terephthalic acid, 1,4-butanediol and a poly(alkylene oxide) glycol when melt blended with 1-25 parts of an ionomer resin and 1-25 parts of an olefin copolymer containing epoxide groups form compositions having sufficiently high melt tension to permit extrusion blow molding. The compositions are further characterized as exhibiting good elastic recovery and softness.

U.S. Pat. No. 4,246,378, granted Jan. 20, 1981 to Kometani et al discloses the addition of ethylene copolymers containing glycidyl groups for increasing the melt strength and viscosity of polyesters.

SUMMARY OF THE INVENTION

The present invention provides polyester compostions which are suitable for extrusion blow molding large objects having smooth surfaces. The compositions are based on injection molding and extrusion grades of PET.

More specifically, the compositions of the present invention are semi-crystalline blow moldable compositions comprising melt blends consisting essentially of the following ingredients:

a) 62-88 weight percent of at least one PET selected from the group consisting of branched PET having an inherent viscosity of at least about 0.60 dl/g and a mixture of the branched PET and a linear PET having an inherent viscosity of at least about 0.65 dl/g, the mixture containing up to 90 weight percent of the linear PET, b) 10-30 weight percent of at least one ethylene copolymer, E/X/Y, wherein E is at least 50 weight percent of units derived from ethylene, X is 2-10 weight percent of units derived from glycidyl (meth)acrylate and Y is 0-40 weight percent of units derived from a $C_1$-$C_6$ alkyl (meth)acrylate, and c) 2-8 weight percent of at least one ionomer obtained by neutralizing with $Na^+$ or $K^+$ at least about 40 percent of the carboxyl groups in an ethylene copolymer which contains about 9-20 weight percent of units derived from (meth)acrylic acid and 0-35 weight percent of units derived from $C_1$-$C_6$ alkyl (meth)acrylate.

Optionally, component d), a second polyester other than PET, may be added in the amount of 2-6 parts per 100 parts (pph) by weight of components a), b) and c), which second polyester assists in the processing of the compositions. The second polyester is selected from the group consisting of (1) polyesters of $C_3$-$C_{10}$ $\alpha$, $\omega$-diols and aromatic dicarboxylic acids, (2) polyarylates and (3) copolyetherester block copolymers.

DETAILED DESCRIPTION OF THE INVENTION

The present invention relates to semi-crystalline blow moldable polyester compositions which possess high melt strengths and melt viscosities as well as yielding high quality smooth surface appearance on the blow molded parts.

More specifically, the compositions of the present invention are semi-crystalline blow moldable compositions comprising melt blends consisting essentially of the following ingredients:

a) 62-88 weight percent of at least one PET selected from the group consisting of branched PET having an inherent viscosity of at least about 0.60 dl/g and a mixture of the branched PET with a linear PET having an inherent viscosity of at least about 0.65 dl/g, the mixture containing up to 90 weight percent of the linear PET, b) 10-30 weight percent of at least one ethylene copolymer, E/X/Y, wherein E is at least 50 weight percent of units derived from ethylene, X is 2-10 weight percent of units derived from glycidyl (meth)acrylate and Y is 0-40 weight percent of units derived from a $C_1$-$C_6$ alkyl (meth)acrylate, and (c) 2-8 weight percent of at least one ionomer obtained by neutralizing with $Na^+$ or $K^+$ at least about 40 percent of the carboxyl groups in an ethylene copolymer which contains about 9-20 weight percent of units derived from (meth)acrylic acid and 0-35 weight percent of units derived from $C_1$-$C_6$ alkyl (meth)acrylate.

The weight percentages given for each of components a), b) and c) are based on the total of these components only.

In the above description, and throughout this application the description "(meth)acrylate" is meant to include both "acrylate" and "methacrylate."

Optionally, component d), a second polyester other than PET, may be added in the amount of 2-6 pph by weight of components a), b) and c), which second polyester assists in the processing of the compositions. The second polyester is selected from the group consisting of (1) polyesters of $C_3$-$C_{10}$ $\alpha$, $\omega$-diols and aromatic dicarboxylic acids, (2) polyarylates and (3) copolyetherester block copolymers.

Preferred compositions of the present invention are semi-crystalline blow moldable compositions comprising melt blends consisting essentially of the following ingredients:

a) 69-82 weight percent of at least one PET selected from the group consisting of branched PET having an inherent viscosity of at least about 0.60 dl/g and a mixture of the branched PET with a linear PET having an inherent viscosity of at least about 0.65 dl/g, the mixture containing up to 80 weight percent of the linear PET, b) 15-25 weight percent of at least one ethylene copolymer, E/X/Y, wherein E is at least 57 weight percent of units derived from ethylene, X is 4-8 weight percent of units derived from glycidyl (meth)acrylate and Y is 10-35 weight percent of units derived from a $C_1$-$C_6$ alkyl (meth)acrylate, and (c) 3-6 weight percent of at least one ionomer obtained by neutralizing with $Na^+$ or $K^+$ at least about 40 percent of the carboxyl groups in an ethylene copolymer which contains about 9-20 weight percent of units derived from (meth)acrylic acid and 0-35 weight percent of units derived from $C_1$-$C_6$ alkyl (meth)acrylate.

Optionally, component d), a second polyester other than PET, may be added in the amount of 3-5 parts per 100 parts by weight of components a), b) and c), which second polyester assists in the processing of certain compositions. The second polyester is selected from the group consisting of (1) polyesters of $C_3$-$C_{10}$ $\alpha,\omega$-diols and aromatic dicarboxylic acids, (2) polyarylates and (3) copolyetherester block copolymers.

Component a) is a polyester selected from the group consisting of branched poly(ethylene terephthalate) (PET) having an inherent viscosity of at least 0.60 dl/g and mixtures of the branched PET with up to 90 weight percent of linear PET having an inherent viscosity of at least about 0.65 dl/g.

Linear PET is a well established commercial product which is normally made by esterification of terephthalic acid with ethylene glycol followed by polycondensation. PET having an inherent viscosity of about 0.65 dl/g may be made by polycondensation in the melt. PET having inherent viscosities of about 1.0 dl/g are usually prepared by subsequent solid phase polycondensation of lower molecular weight PET first prepared by melt condensation. Recycled PET bottle resin represents a source of relatively inexpensive linear PET which with proper recycling of PET bottles will be available in very substantial amounts. The PET used for bottles normally contains a minor amount, about 2% by weight, of a second glycol such as diethylene glycol, the presence of which facilitates the manufacture of oriented PET bottles; and normally has an inherent viscosity of at least 0.65 dl/g and preferably has an inherent viscosity of about 0.7-0.72 dl/g. The presence of the second glycol monomer does not adversely affect the use of recycled PET resin in the present invention.

Branched PET can be made by substantially the same processes as are used for linear PET with the exception that a minor amount of a tri- or higher functionality polyol or polyacid monomer is added to the polymerization. Trifunctional acids are usually preferred and of these, trimellitic anhydride or tri-lower alkyl esters of trimellitic acid are especially preferred. From about 0.2–1.0 mole of trifunctional monomer per 100 moles of terephthalic acid can be used with 0.4 to 0.7 moles being preferred.

Branched PET containing preferred amounts of branching agent; i.e., 0.4 to 0.7 moles of branching agent per 100 moles of terephthalic acid, are useful for preparing compositions of this invention which can be used for forming very large articles by extrusion blow molding. When blends of branched and linear PET are used, the higher the inherent viscosity of the linear PET, the smaller may be the proportion by weight of branched PET in the blends. The concentration of branching agent in the branched PET is also important in that a lesser amount of branched PET containing a higher level of branching agent is required than is a branched PET containing lower levels of branching agent. Compositions prepared from mixtures containing 10–60 weight percent branched PET, preferably 20–50 weight percent, having the preferred concentration of branching agent with recycled PET bottle resin, which normally has an inherent viscosity of about 0.7 dl/g, are very economical and highly useful for extrusion blow molding.

Branched PET has a higher melt viscosity and greater melt strength than does linear PET having the same inherent viscosity. Because of these properties, branched PET having relatively low inherent viscosity is useful either alone or in admixture with linear PET in preparing the compositions of this invention. The use of branched PET alone or in blends with linear PET having a relatively low inherent viscosity yields compositions which are versatile in terms of the size and complexity of the articles which can be blow molded from them. For economic reasons, blends of branched PET with recycled PET bottle resin are of particular interest.

Component b) is an ethylene copolymer, E/X/Y, where E is at least 50 weight percent of units derived from ethylene, X is 2–10 weight percent of units derived from glycidyl (meth)acrylate and Y is about 0–40 weight percent of units derived from $C_1$–$C_6$ alkyl (meth)acrylate. Thus, component b may be a dipolymer of ethylene and glycidyl (meth)acrylate. More preferred are terpolymers containing up to 40 weight percent of units derived from meth(acrylate) lower alkyl esters of which n-butyl acrylate is preferred. Most preferred are terpolymers of ethylene containing 10–35 weight percent of n-butyl acrylate and 4–8 weight percent of glycidyl methacrylate.

Component b) is used in amounts of 10–30 weight percent, and more preferably 15–25 weight percent based on the total weight of components a), b), and c). Since components b) and c) each contribute to the blow moldability of the instant compositions by increasing melt viscosity, melt strength and die swell, the preferred amount of component b) used within the aforementioned ranges is partly dependent on the level of component c). The epoxide content of component b) is another factor which affects the amount of component b) used. In general, the greater the epoxide content of component b), the less of component b) will be required. Finally, consideration must be given to the proportion of branched PET used as well as its concentration of branching agent.

Component c) is an ionomer obtained by neutralizing with $Na^+$ or $K^+$, provided by a basic sodium or potassium compound, at least about 40 percent of the carboxyl groups contained in an ethylene copolymer containing about 9–20 weight percent of units derived from (meth)acrylic acid. Optionally these ionomers may contain up to about 35 weight percent of units derived from $C_1$–$C_6$ alkyl (meth)acrylate. A preferred termonomer is n-butyl acrylate. Component c) is used in amounts of 2–8 weight percent, preferably 3–6 weight percent based on the total weight of components a), b), and c). Since component c) contributes to the blow moldability of the compositions of this invention, the preferred amount of component c) used depends at least in part on the amount of component b) present in a given composition. In addition, component c) improves the stability of the molten composition during processing which in turn permits extrusion of smooth parisons.

As noted above, each of components b) and c) contributes to the blow moldability of the compositions of this invention. In general, increasing the concentration of either of the components within the ranges specified will raise the melt viscosity of a given blow molding composition. While blow moldability is more than a function of melt viscosity, for guidance it should be noted that compositions having melt viscosities at about 270° C. of at least about 10,000 to 15,000 Pa sec at 1 $sec^{-1}$ are usually suitable for forming articles requiring a parison of up to about 61 cm (2 feet) in length and compositions having melt viscosities at the above temperature of at least about 20,000 to 30,000 Pa sec at 1 $sec^{-1}$ are usually suitable for forming articles requiring a parison greater than 61 cm in length. The melt rheology of the compositions df the present invention makes them suitable for thermoforming applications.

Reference to the Samples contained below will assist one in selecting amounts of components b) and c) which will yield a composition suitable for a given molding application.

As stated above, the addition of a minor amount of a polyester other than branched and/or linear PET may assist in the processing of certain compositions based on PET. Compositions melting near 250° C or above generally exhibit melt viscosities which diminish rapidly with increasing tempertures in the range used for blow molding. The ratio of the melt viscosity at 27° C. to the melt viscosity at 280° C. may approach 10 for some compositions. Because of this extreme sensitivity of the melt viscosity to temperature, minor fluctuations in temperature on the low side result in excessive torque within the extruder of the blow molding machine while conversely, temperatures on the high side cause the melt to be too fluid to form a stable parison. Such compositions can only be blow molded satisfactorily in equipment where excellent temperature control is possible. By adding a minor amount of a second polyester, such sensitive compositions are converted to materials which can be readily processed in any conventional extrusion blow molding machine. The addition of a second polyester is usually not required for compositions of the present invention containing substantial amounts of recycled bottle PET because such PET already contains a second monomer which lowers the melting point of the composition and improves processibility.

In essence, any polyester based on a diol other than ethylene glycol and/or based on a diacid other than terephthalic acid can be used to improve the processing of compositions which exhibit the problems just discussed. Polyesters based on aromatic diacids are preferred because compositions modified with aliphatic polyesters may exhibit decreased hydrolytic stability.

Three classes of polyesters have been found to be particularly useful for the modification of temperature sensitive compositions. They are as follows:
1. Polyesters of $C_3$-$C_{10}$ $\alpha$, $\omega$-diols and an aromatic dicarboxylic acid;
2. Polyarylates of dihydric phenols and an aromatic dicarboxylic acid, and
3. Copolyetherester block copolymers derived from a low molecular weight diol, a polyether glycol and an aromatic dicarboxylic acid.

The polyesters of class 1 are close relatives of PET and can be prepared substantially by the same condensation procedures used to make PET. $\alpha$, $\omega$-diols are preferred. Preferred dicarboxylic acids are the three isomeric phthalic acids, but substituted phthalic acids and acids such as 1,5-,2,6-and 1,4-naphthalene dicarboxylic acid are also useful. The preferred polyester of class 1 is PBT.

The polyarylates of class 2 are aromatic polyesters derived from one or more dihydric phenols and one or more aromatic dicarboxylic acids. The dihydric phenol is preferably a bisphenol as described in U.S. Pat. No. 4,187,358 having the structure:

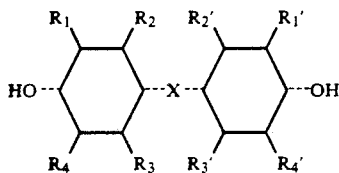

wherein —X— is selected from the group consisting of nothing; i.e., a covalent bond, —O—, —S—, —$SO_2$—, —SO—, —CO—, an alkylene group containing 1 to 5 carbon atoms and an alkylidene group containing 2 to 7 carbon atoms, and $R_1$, $R_2$, $R_3$, $R_4$, $R_1'$, $R_2'$, $R_3'$, and $R_4'$, may be the same or different, and each is selected from the group consisting of a hydrogen atom, a chlorine atom, a bromine atom and an alkyl group containing 1 to 5 carbon atoms, and/or a functional derivative thereof. 2,2'-Bis(4-hydroxyphenyl)propane is most preferred.

Additionally, up to 40 mole percent of mononuclear dihydric phenols may be used in combination with the bisphenols. Representative are hydroquinone and resorcinol and substituted derivatives thereof containing one to four substituents selected from the group consisting of chlorine, bromine and lower alkyl.

Preferably, a mixture of 90 to 0 mole percent of terephthalic acid and/or the functional derivatives thereof and 10 to 100 mole percent of isophthalic acid and/or its functional derivatives is used as the acid component to be reacted with the bisphenol to prepare the polyarylate. Preparative methods for polyarylates are described in detail in U.S. Pat. Nos. 3,884,990, 3,946,091, 4,052,481 and 4,485,230.

Preferred polyarylates for use in the compositions of this invention are derived from isophthalic acid optionally containing up to 30 weight percent terephthalic acid and 2,2'-bis(4-hydroxyphenyl)propane.

The copolyetherester block copolymers of class 3 consist essentially of 15-95 weight percent of short chain ester units which are derived from a low molecular weight diol and an aromatic dicarboxylic acid and 5-85 weight percent of long chain ester units which are derived from a poly(alkylene oxide) glycol having a number average molecular weight of 400-6000 and an aromatic dicarboxylic acid. These polymers are readily prepared by substantially the same procedures useful for preparing PET, with the exception of adding a poly(alkylene oxide) glycol to the reaction mass. Polymers derived from terephthalic acid (optionally containing some isophthalic acid), butanediol and a poly(alkylene oxide) glycol selected from the group consisting of poly(tetramethylene oxide) glycol, poly(1,2-propylene oxide) glycol and ethylene oxide-capped poly(1,2-propylene oxide) glycol are readily available as commercial products.

Of the three classes of polyesters, those of class 1 are preferred with poly(butylene terephthalate) being especially preferred when molded articles having high flexural modulus are desired. It should be noted that the polyesters of class 3 which are known to be elastomers reduce the rigidity of the compositions of this invention and yield articles having outstanding impact resistance.

When the compositions are modified by the addition of a second polyester, the second polyester should be used in amounts of 2-6 parts by weight, preferably 3-5 parts by weight, based on 100 parts of the sum of components a), b) and c). Note that the sum of the percentages of a), b) and c) equals 100 weight percent and the amount of the second polyester, being an optional component, is in addition to the weight of the basic composition.

The compositions of the present invention may contain minor amounts of a variety of additives which are frequently used in plastics. Such additives include antioxidants, UV stabilizers, dyes, pigments, flame retardants, fibrillatable fluoropolymers and fillers. The use of reinforcing fillers such as chopped glass fibers and acicular calcium metasilicate permits the preparation of moldings which exhibit exceptional rigidity. Reinforcing fillers may be used in amounts of up to about 40 parts by weight based on 100 parts of the total of components a), b) and c) which three ingredients total 100%. In other words, up to about 40 parts by weight of filler can be used for 100 parts by weight of components a), b) and c). The presence of reinforcing fillers generally raises the melt viscosity of the compositions of this invention. If significant amounts of reinforcing fillers are used it may be necessary to either (1) decrease the amounts within the limits specified herein of components b and c each of which enhances melt viscosity; or (2) employ a PET or PET mixture [component a)] with a lower melt viscosity. For instance, with 20 parts of acicular calcium silicate, compositions based on branched PET having an inherent viscosity of 0.65 dl/g are so viscous that they may overheat in the extruder. This problem may be remedied by replacing part of the branched PET with linear PET having an inherent viscosity of about 0.65 to 0.7 dl/g. Because of their potentially low cost, filled compositions based largely on recycled bottle PET are of particular interest for blow molded articles exhibiting exceptional rigidity.

In the following samples the various samples were prepared by melt blending the indicated ingredients, by extrusion in a 28 or 57 mm twin screw extruder.

For Table VI and VIII below the ingredients of the compositions, namely components a, b and c, were added to the rear of the extruder. For illustration, the feed rates for Sample 8-1 are as follows:
Component a: 53.0 kgs/hr
Component b: 12.3 kgs/hr
Additives A and B: 726 gms/hr The ingredients were blended on a Werner and Pfleiderer bilobal twin screw extruder having a diameter of 57 mm and a length to diameter ratio of 37. The screw used was a general purpose screw with vacuum capability consisting of conveying elements to convey the feed material from the feed zone to a melting zone in which the material was compressed and melting begins. A section of "kneading blocks" followed by "reverse elements" next provides high shear and pressure to further the melting and mixing process. The reverse elements serve also to provide a melt seal following which the melt is decompressed in the section under vacuum. Following the vacuum zone, introduced via a side feeder at the rate of 6.54 kg/hour was a mixture obtained by dry blending components c) and components d) at a ratio of 9.6 to 4.8, respectively. Also introduced via the side feeder was Additive C at the rate of 18.2 kg/hr. After the side feeder, the screw recompresses the melt and passes it through kneading blocks and reverse elements which also serve as a vacuum seal for a second vacuum zone. Then the melt is recompressed and mixed as it passes through the end of the extruder and out the die.

Representative extrusion conditions for the compositions shown in Table VIII are:

| Setting Zone 1 (°C.) | Setting Zone 2 (°C.) | Setting Zone 3 (°C.) | Setting Zone 4 (°C.) | Setting Zone 5-10 (°C.) | Setting Die (°C.) |
|---|---|---|---|---|---|
| 260 | 260 | 260 | 260 | 260 | 260 |

| Sample | Screw Speed (rpm) | Extru. Rate Kg/hr | Melt Temp (°C.) |
|---|---|---|---|
| 8-1 | 225 | 90.8 | 326 |

The product was extruded at a rate of 90.8 kgs/hour through a six hole die. Temperature of the melt exiting the extruder die was measured as the melt temperature. Melt strands exiting the extruder were quenched in water and cut into pellets. The pelletized product was dried at 100°–105° C. in a circulating air drier equipped with dehumidifier.

Representative extrusion conditions for the compositions shown in Table VI are:

| Setting Zone 1 Temp (°C.) | Setting Zone 2 Temp (°C.) | Setting Zone 3 Temp (°C.) | Setting Zone 4 Temp (°C.) | Setting Zone 5-10 Temp (°C.) | Setting Die Temp (°C.) |
|---|---|---|---|---|---|
| 270 | 270 | 270 | 270 | 270 | 270 |

| Sample | Screw Speed (rpm) | Extru. Rate Kg/hr | Melt Temp (°C.) |
|---|---|---|---|
| 6-1 | 175 | 68.1 | 326 |
| 6-2 | 175 | 68.1 | 316 |
| 6-3 | 175 | 68.1 | 323 |

For the remaining Samples in Table VI, the amounts and proportions of the various components can be calculated from the information in Table VI.

For Tables VII below the ingredients of the compositions were placed in a polyethylene bag and tumbled to mix. The resulting dry blend was melt blended on a Werner and Pfliederer twin-screw extruder having a diameter of 28mm and a length to diameter ratio of 27.5. The screw used is a general purpose screw with vacuum capability consisting of conveying elements to convey the feed material from the feed zone to a melting zone in which the material is compressed and melting begins. A section of "kneading blocks" followed by "reverse elements" next provides high shear and pressure to further the melting and mixing processes. The reverse elements serve also to provide a melt seal following which the melt is decompressed in the section under vacuum. Following the vacuum zone, the screw recompresses the melt and passes it through kneading blocks and reverse elements which also serve as a vacuum seal for this side of the vacuum zone. The melt is then further compressed and mixed as it passes through the end of the extruder and out the die.

Representative extrusion conditions for the compositions shown in Table VII are:

| Setting Zone 1 (°C.) | Setting Zone 2 (°C.) | Setting Zone 3 (°C.) | Setting Zone 4 (°C.) | Setting Zone 5 (°C.) | Setting Die (°C.) |
|---|---|---|---|---|---|
| 260 | 260 | 260 | 260 | 260 | 260 |

| Sample | Screw Speed (rpm) | Extru. Rate Kg/hr | Melt Temp (°C.) |
|---|---|---|---|
| 7-1 | 175 | 9.3 | 305 |
| 7-2 | 175 | 8.2 | 313 |
| 7-3 | 175 | 9.4 | 297 |
| 7-4 | 175 | 7.8 | 312 |

Temperatures of the melt exiting the extruder die were measured and reported above. The melt strand exiting the extruder was quenched in water and cut into pellets. The pelletized product was dried in a vacuum oven set a 120° C. and purged with a slight nitrogen sweep overnight. For example, Sample 7-1 had a melt viscosity, measured using a Kayeness viscometer at 270° C. of 30045 Pa sec at 1 sec-1, and 968 Pa sec at 1000 sec-1.

The dried resins for each extruded sample from Tables VI and VII were blow molded using a Rocheleau molding machine equipped with a single-screw extruder. The screw had a 3.81 cm diameter, a length to diameter ratio of 20 and a compression ratio of 2 to 1. Samples marked with dashes denote that the particular sample was not blow molded.

Representative blow molding temperature profiles used to produce the blow molded parts that appear on Table VI are:

| Setting Feed Zone (°C.) | Setting Transition Zone (°C.) | Setting Metering Zone (°C.) | Setting Die Zone (°C.) |
|---|---|---|---|
| 270 | 270 | 265 | 260 |

| Sample | Screw Speed (rpm) | Mold Geometry |
|---|---|---|
| 6-1 | 54 | Bottle |
| 6-2 | 73 | Bottle |
| 6-3 | 110 | Bottle |

Representative blow molding conditions and temperature profiles used to produce the blow molded parts that appear in Table VII are:

| Setting Feed Zone | Setting Transition Zone | Setting Metering Zone | Setting Die Zone |
|---|---|---|---|

-continued

| (°C.) | (°C.) | (°C.) | (°C.) |
|---|---|---|---|
| 260 | 260 | 260 | 250 |

| Sample | Screw Speed (rpm) | Mold Geometry |
|---|---|---|
| 7-1 | 77 | Bottle |
| 7-2 | 40 | Bottle |
| 7-3 | 105 | Bottle |
| 7-4 | 47 | Bottle |

The resins for each Sample in the Tables above were extruded at the designated screw speed through the die to produce a parison. Upon closing the molded, the part is blown with air at about 400 MPa. The blown part is cooled in the mold under pressure and ejected. The mold geometry of the bottles are 22.5 cm high and 7.5 cm diameter; and the spoiler has dimensions of 136 cm long, 9 cm wide and 1.5 cm thick.

Blow molded automobile spoilers, were also produced from the compositions of Table VIII. The procedure and conditions used for blow molding the spoiler are as follows:

The dried resin product was blow molded using a Sterling blow molding machine equipped with a 819 cm diameter barrier type screw with a length to diameter ratio of 24:1 and an accumulator of the first-in-first-out design with a capacity of 6.8 kg. The extruder barrel of the blow molding machine was heated and the temperature reulated at 260° C., 260° C. 255° C. and 255° C. for each of the four temperature zones, respectively. The three zones of the accumulator were set at 263° C. The extruder screw was operated at a rate of 30 RPM. The automobile spoler mold was heated to 90° C.

A number of physical properties were measured for each composition. The notch Izod impact strength was determined according to ASTM D-256 measured at 23° C. Tensile properties (tensile yield strength and elongation) at room temperature were measured by ASTM Procedure D-638. The flexural modulus was measured according to ASTM Procedure D-790. Samples were also tested for melt viscosity. The measurement of melt viscosity is described below:

Blow molding resins were first dried in a vacuum oven at 110° C. overnight. Melt viscosity was measured using a Kayeness Rheometer under the following test conditions:

Temperature: 270° C. and/or 280° C.
Die Length to diameter ratio: 20
Die Length: 15.24 mm
Die diameter: 0.76m
Piston diameter: 9.53 mm
Piston rate: 1.52 to 152 mm/minute In Table I, the inherent viscosities of PET were measured at 25° C. according to ASTM Procedure D-2857, "Standard Method for Dilute Solution Viscosity of Polymers". Viscosity was measured using a solution containing 0.5 gm polymer per 100 ml of solution. The solvent used consisted of a mixture of 1 part trifluoroacetic acid and 3 parts methylene chloride by volume.

In the following samples, all percentages of component a), b) and c), are given by weight. The amounts of materials other than components a), b) and c) are given in parts per 100 parts of the total weight of components a), b) and c). All values originally obtained in British units have been converted to S.I. units and rounded, where appropriate, and finally blanks in the Tables denote either absence of a particular component or that a particular test was not run.

TABLE I

| Code | Identification of Component a) Description |
|---|---|
| A | Polyethylene terephthalate (PET) containing 0.5 mole percent trimethyl trimellitate branching agent with an inherent viscosity (IV) of 0.65 dl/g. |
| B | Recycled bottle resin, linear PET containing about 2 weight percent of comonomer, with an IV of 0.7 dl/g. |
| C | PET homopolymer with an IV of 1.0 dl/g. |

Table II

Identification of

Component b)

Description

Terpolymer of ethylene/27% butyl acrylate/5% glycidyl methacrylate

Table III

Identification of

Component c)

Description

Sodium ionomer derived from ethylene/15% methacrylic acid copolymer (MAA) in which 59% of the acid groups have been converted to the corresponding sodium salt.

Table IV

Identification of Component d)

Description

A copolymer prepared by ester interchange followed by polycondensation of 4.52 moles of dimethyl terephthalate, 1.32 moles of dimethyl isophthalate, 1.0 mole of polytetramethyleneether glycol (having a number average molecular weight of 980) and excess 1,4-butanediol in the presence of tetrabutyl titanate catalyst.

TABLE V

| Code | Identification of Additives Description |
|---|---|
| A | Tetrakis [methylene (3,5-di-ter-butyl 4-hydroxyhydrocinnamate)] methane |
| B | Oxidized polyethylene used as a mold release agent. |
| C | Acicular naturally occuring calcium meta silicate, surface modified. |

Samples 6-1 to 6-3 in Table VI, demonstrate the significance of components c) and d) in compositions of the present invention.

Sample 6-1, which is a control Sample contains no component c), the ionomer. Bottles could only be obtained at the very beginning of blow molding (when the screw was only partially filled) on this sample due to the poor processability, as shown by the fact that the screw speed dropped to zero.

Sample 6-2 which contains component c) shows a higher melt viscosity at both 1 sec-1 and 1000 sec-1 than Sample 6-1 but was significantly more processable than Sample 6-1 as shown by the screw speed. Parisons were extruded continuously and blown without difficulty for Sample 6-2.

Sample 6-3 which contains a second polyester, component d, in addition to the ingredients used in Sample 6-2, shows good processability as evidenced by the high screw speed despite its increased melt viscosity at shear rates of 1 sec-1 and 1000 sec-1 as compared to Sample 6-2. The bottles obtained for Sample 6-3 were smooth inside and outside.

In comparing Samples 7-1 and 7-3, Sample 7-1 gives bottles with smoother surface than Sample 7-3 which contained no component d and higher levels of ionomer component c).

Compare control samples 7-2 and 7-4, which contain no branched PET to Samples 7-1 and 7-3 which contain branched PET. It can be seen that the control samples show lower processability in the blow molding screw speed.

TABLE VII

PET Formulation containing a Branched and Linear PET

| Sample | ID Comp a | % Comp a | % Comp b | % Comp c | pph Comp d | Additive A (pph) |
|---|---|---|---|---|---|---|
| 7-1 | A | 76.24 | 18.6 | 5.17 | 3.1 | 0.21 |
| *7-2 | C | 76.24 | 18.6 | 5.17 | 3.1 | 0.21 |
| 7-3 | A | 73.95 | 18.0 | 8.02 | — | 0.20 |
| *7-4 | C | 73.95 | 18.0 | 8.02 | — | 0.20 |

| Sample | Melt Temp (°C.) | RPM | Kg/hr | Viscosity Pa sec @1 sec−1 | Viscosity Pa sec @1000 sec−1 | Viscosity Temp (°C.) |
|---|---|---|---|---|---|---|
| 7-1 | 305 | 175 | 9.2 | 30045 | 968 | 270 |
| *7-2 | 313 | 175 | 8.2 | 26546 | 1149 | 270 |
| 7-3 | 297 | 175 | 9.4 | 35368 | 1075 | 270 |
| *7-4 | 312 | 175 | 7.8 | 41821 | 1387 | 270 |

| Sample | Flex Mod (MPa) | Blow Molding (RPM) | Bottle Quality |
|---|---|---|---|
| 7-1 | 1482 | 77 | Strong melt; very smooth bottle |
| *7-2 | 1476 | 40 | Parison sagged in mold; bottle surface wavy; some lumps |
| 7-3 | 1462 | 105 | Slight specks on otherwise smooth surface |
| *7-4 | 1469 | 47 | Parison sagged in mold; bottle surface rough, many lumps |

*Control Samples

TABLE VI

Comparison of PET Blow Molding Resins

| Sample | ID Comp a | % Comp a | % Comp b | % Comp c | pph Comp d | Additive A (pph) |
|---|---|---|---|---|---|---|
| *6-1 | A | 80.39 | 19.62 | — | — | 0.326 |
| 6-2 | A | 76.24 | 18.60 | 5.15 | — | 0.206 |
| 6-3 | A | 76.24 | 18.60 | 5.0 | 3.0 | 0.200 |

| Sample | Melt Temp (°C.) | RPM | Kg/hr | Viscosity Pa sec @1 sec−1 270° C. | Viscosity Pa sec @1 sec−1 280° C. | Viscosity Pa sec @1000 sec−1 270° C. | Viscosity Pa sec @1000 sec−1 280° C. |
|---|---|---|---|---|---|---|---|
| *6-1 | 324 | 175 | 68.1 | 43917 | 12599 | 1303 | 632 |
| 6-2 | 316 | 175 | 68.1 | 56909 | 19536 | 1409 | 900 |
| 6-3 | 323 | 175 | 68.1 | 65000 | 32535 | 1600 | 900 |

| Sample | Blow Molding (RPM) | Bottle Quality |
|---|---|---|
| *6-1 | 45→0 | Bottles ruptured in spots; uneven blow in the bottle |
| 6-2 | 65 | Strong melt; bottle smooth outside, small specks inside |
| 6-3 | 130 | Strong melt; bottle smooth outside and inside |

*Control Sample

Sample 7-1 through 7-4 in Table VII show PET compositions of the present invention containing linear PET and branched PET.

Sample 8-1 in Table VIII demonstrates the use of branched and linear PET in a composition of the present invention. The melt viscosities at both 1 sec-1 and 1000 sec-1 are excellent and the blow molded automobile spoiler obtained showed very smooth surfaces and excellent melt strength.

TABLE VIII

| | Filled Compositions Based on a Mixture of Branched and Recycled Bottle Linear PET | | | | | |
|---|---|---|---|---|---|---|
| Sample | ID Comp a | % Comp a | % Comp b | % Comp c | pph Comp d | Additive A (pph) |
| 8-1 | A/B | 15.2/60.8 | 17.7 | 6.25 | 3.1 | 0.39 |

| Sample | Additive B (pph) | Additive C (pph) | Melt Temp (°C.) | RPM | Kg/hr | Viscosity Pa sec @1 sec−1 | Viscosity Pa sec @1000 sec−1 |
|---|---|---|---|---|---|---|---|
| 8-1 | 0.65 | 26.0 | 326 | 225 | 90.8 | 34000 | 1002 |

| Sample | Spoiler Quality |
|---|---|
| 8-1 | Strong melt; spoiler had reasonably smooth surfaces |

I claim:

1. A semi-crystalline extrusion blow-moldable polyester composition comprising melt blends consisting essentially of:
   a) 62-88 weight percent at least one poly(ethylene terephthalate) PET selected from the group consisting of branched PET having an inherent viscosity of at least 0.60 dl/g and a mixture of the branched PET with linear PET having an inherent viscosity of at least about 0.65 dl/g, the mixture containing up to 90 weight percent of the linear PET,
   b) 10-30 weight percent of at least one ethylene terpolymer, E/X/Y, where E is ethylene at least 57 weight percent, X is glycidyl methacrylate from 4-8 weight percent and Y is from 10-35 weight percent of a moiety derived from $C_1$-$C_6$ alkyl (meth)acrylate,
   c) 2-8 weight percent of at least one ionomer obtained by neutralizing with Na+ or K+ at least 40 percent of the carboxyl groups in an ethylene copolymer which contains about 9-20 weight percent of units derived form (meth)acrylic acid and 0-35 weight percent of units derived from $C_1$-$C_6$ alkyl (meth)acrylate, the weight percentages given for each of components a), b) and c) being based on the total of these components only.

2. The composition of claim 1 containing a further component d), which is at least one polyester other than PET and is present in the composition in the amount of about 2-6 parts per 100 parts by weight of the composition.

3. The composition of claim 1 wherein component a) is branched PET.

4. The composition of claim 1 wherein the linear PET is recycled bottom PET having an inherent viscosity of at least 0.65 dl/g.

5. The composition of claim 1 wherein component a) is present in an amount of 69-82 weight percent, component b) is present in an amount of 15-25 weight percent and component c) is present in an amount of 3-6 weight percent.

6. The composition of claim 2 wherein component d) is present in an amount of about 2-4 parts per 100 parts by weight of the total of components a), b) and c).

7. The composition of claim 1 wherein Y is derived from n-butyl acrylate.

8. The composition of claim 1 wherein component c) is obtained by neutralizing with Na+.

9. The composition of claim 1 which additionally contains up to about 40 parts of at least one filler per 100 parts by weight of the total weight of components a), b) and c).

10. The composition of claim 9 wherein the filler is selected from chopped glass fibers and acicular calcium metasilicate.

11. The composition of claim 1 wherein the mixture in component a) contains up to 80 weight percent of a linear PET.

* * * * *

UNITED STATES PATENT AND TRADEMARK OFFICE
CERTIFICATE OF CORRECTION

PATENT NO. : 5,091,459
DATED : February 25, 1992
INVENTOR(S) : King Lau Howe

It is certified that error appears in the above—identified patent and that said Letters Patent is hereby corrected as shown below:

Column 16, line 22, "bottom" should be --bottle--.

Signed and Sealed this

Second Day of November, 1993

Attest:

BRUCE LEHMAN

Attesting Officer

Commissioner of Patents and Trademarks